US 6,737,183 B1

(12) United States Patent
Mazzucchelli et al.

(10) Patent No.: US 6,737,183 B1
(45) Date of Patent: May 18, 2004

(54) HUMIDIFICATION DEVICE FOR POLYMERIC MEMBRANE FUEL CELLS

(75) Inventors: Gabriele Mazzucchelli, Milan (IT); Massimo Brambilla, Bussero (IT); Gian Piero Fleba, Milan (IT); Antonio Maggiore, Milan (IT)

(73) Assignee: Nuvera Fuel Cells Europe S.r.l. (IT)

( * ) Notice: Subject to any disclaimer, the term of this patent is extended or adjusted under 35 U.S.C. 154(b) by 0 days.

(21) Appl. No.: 09/958,589

(22) PCT Filed: May 17, 2000

(86) PCT No.: PCT/EP00/04476
§ 371 (c)(1),
(2), (4) Date: Oct. 9, 2001

(87) PCT Pub. No.: WO00/70698
PCT Pub. Date: Nov. 23, 2000

(30) Foreign Application Priority Data

May 17, 1999 (IT) .......................... MI99A1090

(51) Int. Cl.⁷ .................................................. H01M 8/04
(52) U.S. Cl. .............................. 429/17; 429/13; 429/12; 429/19; 429/20; 429/26; 429/32
(58) Field of Search .................. 429/12, 13, 26, 429/30, 31, 17, 19, 20, 32

(56) References Cited

U.S. PATENT DOCUMENTS

| | | | | |
|---|---|---|---|---|
| 5,578,388 A | * | 11/1996 | Faita et al. ..................... 429/30 |
| 5,635,039 A | * | 6/1997 | Cisar et al. ..................... 204/252 |
| 6,022,634 A | * | 2/2000 | Ramunni et al. ................ 429/34 |
| 6,146,780 A | * | 11/2000 | Cisar et al. ..................... 429/34 |
| 6,149,810 A | * | 11/2000 | Gonzalez-Martin et al. ..... 210/321.84 |
| 6,183,623 B1 | * | 2/2001 | Cisar et al. ..................... 205/618 |

FOREIGN PATENT DOCUMENTS

| | | |
|---|---|---|
| DE | 19743067 | 4/1999 |
| WO | 9845889 | 4/1997 |
| WO | 9833221 | 1/1998 |

OTHER PUBLICATIONS

Nguyen et al, "A Water . . . Fuel Cells", Journal of the Electrochemical Society, U.S., Electrochemical Society Manchester, New Hampshire, vol. 140, No. 8, pp. 2178–2186.

* cited by examiner

Primary Examiner—Bruce F. Bell
(74) Attorney, Agent, or Firm—Muserlian, Lucas and Mercanti (57) ABSTRACT

A humidification device for polymeric membrane fuel cell stacks fed with gaseous reactants is disclosed. The gases supplied to the stack are previously fed in admixture with a stream of liquid water to a chamber filled with a reticulated material, whose highly subdivided geometry provides an extended exchange surface favouring the saturation of gas. The device is more efficient and compact than those known in the art.

17 Claims, 5 Drawing Sheets

HUMIDIFICATION DEVICE FOR POLYMERIC MEMBRANE FUEL CELLS

This application is a 371 of PCT/EP00/00476 filed May 17, 2000.

DESCRIPTION OF THE INVENTION

The invention relates to a fuel cell, and more precisely to a fuel cell using a polymeric membrane as the electrolyte.

Fuel cells are electrochemical generators of electric energy in the form of direct current; that is, they convert the free energy of reaction of a fuel (for example a gaseous mixture containing either hydrogen, or light alcohols such as methanol or ethanol) with an oxidant (for example air or oxygen) without its complete degradation to thermal energy, and therefore without being subject to the limitation of the Carnot cycle. In order to achieve the desired conversion of chemical to electrical energy, the fuel is oxidised at the cell anode, with the concurrent release of electrons and $H^+$ ions, while the oxidant is reduced at the cathode, where $H^+$ ions are consumed; the two poles of the generator must be separated by a suitable electrolyte, allowing a continuous flow of $H^+$ ions from the anode to the cathode, at the same time hindering the transfer of electrons from one pole to the other, thereby maximising the electrical potential difference thereof. This potential difference represents in fact the driving force of the process itself. The fuel cells are considered as an excellent alternative to the traditional systems of electric generation; especially in view of the extremely favourable environmental impact (absence of polluting emissions and noise, formation of water as the only by-product), they are used both in the field of stationary power generation of various sizes (electrical power stations, back-up power generators, etc.) as well as in the field of mobile applications (electric vehicle applications, generation of automotive energy or auxiliary energy for space, submarine and naval applications).

The polymeric membrane fuel cells offer, compared with other fuel cells, further advantages, due to their fast start-up and quick achievement of the optimum operation conditions, the high power density, the intrinsic reliability connected both to the lack of moving parts and to the absence of corrosion phenomena and severe thermal cycles; in fact, among all the fuel cells of the prior art, the polymer electrolyte fuel cells exhibit the overall lowest operating temperature (usually, 70–100° C.).

The polymeric electrolyte used for this purpose is an ion-exchange membrane, and more precisely a cation-exchange membrane, that is a chemically inert polymeric backbone, partially modified with functional groups capable of undergoing acid-base hydrolysis leading to a separation of electric charge; such hydrolysis consists more precisely in the release of positive ions (cations) and in the formation of fixed negative charges on the polymeric backbone. Porous electrodes are applied on the membrane surface, which allow the reactants to flow therethrough up to the membrane interface. A catalyst is applied on such interface on the electrode and/or on the membrane side, such as for example platinum black, which increases the relevant half-reaction rate of fuel oxidation or oxidant reduction. This arrangement provides also for the continuous flow of cations when a potential gradient is established between the two faces of the membrane and the external electric circuit is concurrently closed; being the $H^+$ ion the transported cation in this case, as previously mentioned, the potential difference generated upon feeding a species with a lower electrochemical potential at the anode, and a species with a higher electrochemical potential at the cathode, causes protonic conduction across the membrane and electron flow (i.e. electric current) across the external circuit to be established as soon as the latter is closed.

Protonic conduction is an essential condition for the operation of a fuel cell and is one of the decisive parameters to assess its efficiency. An insufficient protonic conduction causes a remarkable drop in the potential difference at the poles of the cell (cell voltage drop) once the electric circuit is closed on the external resistive load which exploits the produced electric output. This, in turn, causes an increased degradation of the energy of reaction to thermal energy and the consequent decrease of the fuel conversion efficiency.

Several cation-exchange membranes showing optimum protonic conduction characteristics are available on the market and are widely used in industrial fuel cells, such as for example those commercialised under the trademarks Nafion® by Dupont de Nemours, U.S.A., Gore Select® by Gore, U.S.A., Aciplex® by Asahi Chemicals, Japan. All these membranes are negatively affected by an intrinsic process limitation associated with their operation mechanism: a being the separation of electric charge which enables the protonic conduction set by a hydrolysis mechanism, such membranes develop their conductivity only in the presence of liquid water. Although the formation of water is an intrinsic consequence of the operation of a fuel cell, its extent results almost always insufficient to maintain the required hydration state of the membrane, especially when operating at a sufficiently high current density.

Operation at high current density involves a decrease in the investment cost for a given power output, but also a decrease in the energy efficiency as well as the generation of a higher amount of heat. The large amount of heat generated in a fuel cell operating a current density of practical use (for example between 150 and 1500 $mA/cm^2$) must be efficiently removed to permit the thermal regulation of the system, not only in view of the limited thermal stability of the ion-exchange membrane, usually unfit for operation above 100° C., but also to limit as much as possible the evaporation of the product water and its consequent removal by the discharge of the inerts and unconverted reactants from the cell. Moreover, as the voltage of a single fuel cell is too small to allow a practical exploitation, said cells are usually connected in electrical series by means of bipolar connections and assembled in a filter-press arrangement feeding the reactants in parallel, as illustrated in U.S. Pat. No. 3,012,086. In such a fuel cell battery arrangement, usually called a stack, the problem of heat removal is amplified with respect to the case of a single cell, wherein it is possible to take advantage of the thermal convection through the external walls.

The above described drying-out of the ion-exchange membrane by removal of an excess amount of water with respect to the amount produced by the reaction is even more remarkable when the fuel cells are fed with gaseous reactants at low pressure. At an early stage of development of this technology, the polymeric membrane fuel cells were operated under relative pressures of a few bars (from 2 to 10, and more commonly from 3 to 5), especially to increase the kinetics of the two half-reactions of fuel oxidation and oxidant reduction. With the later evolution of the technique, the improvements in the catalyst compositions and in the electrode manufacturing induced the fuel cell producers to design stacks capable of operating efficiently at lower pressures, aiming at the operation under hydrogen and air at nearly atmospheric pressure while maintaining a sufficient efficiency and current density as one of the most desirable goals, due to the relevant resulting impact in terms of overall efficiency of the electric generation system. While hydrogen, either pure or in a mixture, is often available at the pressure of a few bars, the compression of atmospheric air, which contains less than 20% of oxygen used as the oxidant in the cell, and more than 80% of inert, involves an extremely severe energy consumption. While the current level of development of the gas diffusion electrodes for fuel cells and of the catalysts therefor makes them already suitable for operating with reactants at substantially atmospheric pressure (aside from the slight overpressure needed to overcome the internal pressure drop of the device, in the range of a few tens of millibar), the fast drying-out of the membranes under low pressure makes these operative conditions hardly sustainable. At constant molar flow rate, in fact, the volumetric flow rate of a gas decreases proportionally with the increase of its absolute pressure; this implies that the supply of non pressurised reactants is associated with the flow of a remarkable volume of gas inside the cells. As regards air, whose unconverted volume fraction is inevitably higher than 80% even in the best case, but sometimes also as concerns the fuel, for instance when hydrogen from steam reforming (having an inert fraction typically in the range of 75–80%) is employed, it is evident that the outlet flow withdraws a high amount of product water.

For all the above reasons, the stacks of the prior art are equipped with suitable hydraulic circuits directed to overcome the aforementioned phenomena; in particular, at least a hydraulic circuit provides for, extracting the heat by thermal exchange with a circulating fluid, while a second circuit is used to introduce an extra amount of water in addition to the product water generated in the cell.

As regards the first circuit, the thermostating fluid may be fed inside serpentines provided in the bipolar plates, or in intermediate chambers located between the single cells and in electrical connection with the same; these solutions complicate the stack fabrication, increasing weights and volumes, in other words reducing the power density, a parameter whose maximisation is highly desired especially in the case of mobile applications.

A less burdensome solution under this aspect is described in the international application WO 98/28809, wherein the cooling fluid is circulated in a peripheral section of the bipolar plate adjacent to the active surface of the cell; in this way, however, a transversal temperature profile is obtained with the central area of the membrane operating at a temperature higher than that of the peripheral area, thereby establishing a thermal gradient which is potentially very dangerous for the integrity of the membrane itself.

As far as the second circuit is concerned, the pre-humidification of the reactants is usually carried out at the inlet of the anodic and cathodic compartments of the fuel cell, for example by bubbling in liquid water or by diffusion of water vapour through suitable membranes in auxiliary cells. Also this second circuit involves an apparent increase in weight, volumes and investment cost; moreover, the amount of water to be fed to the system must be strictly controlled as an excess of liquid in the cell compartments would lead to the dramatic consequence of blocking the access of the gaseous reactants to the surface of the electrodes. The only possibility to achieve a calibration, albeit indirect, of the water supplied by the above system is acting on the temperature of the water itself and thus on its vapour pressure. This in turn leads to the need of thermostating the humidification circuit of the fuel cell stacks, further complicating the construction design.

Furthermore, none of these solutions is capable of bringing the relative humidity of the gaseous reactants close to 100%, as required in case of extreme process conditions.

A more advantageous solution to ensure a suitable water supply to the reactant flow is disclosed in the European Patent Publication No. 316 626 where it is described the humidification of said flow through injection of atomised water thereto, for example by means of a ultrasonic aerosol generator. This solution partially mitigates the need of cooling the stack by a burdensome auxiliary heat exchange circuit, as part of the water fed thereto is vaporised inside the cell, thereby withdrawing a substantial amount of heat. The system however is negatively affected by a basic drawback represented by the construction complexity associated with the aerosol generator which, besides being expensive, consumes a certain portion of the electric output generated by the fuel cells.

In addition, the time of permanence of water in the cell is too short to ensure at the same time the humidification of the membrane and the cooling of the stack without recurring to auxiliary circuits, especially at a high current density and with stacks comprising a high number of cells. Furthermore, the humidification of the reactants or the addition of atomised water prior to sending said reactants to the inlet manifold may cause some water condensation or droplet formation therein, having the consequence of feeding an excess amount of water to some cells of the stack (typically those closer to the reactants inlet) and an insufficient amount to some other cells (typically those farther from the reactants inlet).

A substantially improved design of the cooling and humidification circuits for fuel cells is disclosed in the co-pending Italian Patent Application No. M199A 000829, wherein their substantial combination into a single circuit is achieved by introducing a reticulated conductive body fed with liquid water inside the fuel cells; said water supply is thereby distributed across the whole thickness of the reticulated body, partially evaporating therein. In such a way, the fraction of water which remains in the liquid state contributes to the humidification of the membrane, while the one which evaporates withdraws the thermal energy corresponding to the latent evaporation heat, thus contributing to the thermostating of the cell. This solution offers an extremely compact fuel cell stack design, having good performances in terms of efficiency and current density, provided it is fed with pressurised gaseous reactants. However some limitations would arise in the case of operation under near atmospheric pressure and high current density. In this case, the water demand is so high that the direct mixing of the water and the gas flows inside the cell results scarcely practical and flexible. This occurs also because the integration of the humidification and cooling circuits, although being beneficial in terms of compactness, subtracts one degree of freedom to the water and thermal management of the system; that is, while in a customary stack it is possible to act on the temperatures of the two distinct water flows (those associated with the cooling and the humidification circuits) to meet the requirements imposed by the most severe process conditions, with the single integrated circuit a compromise must be found. A stack with a single humidification and cooling circuit, albeit suitable for operating with good performances under standard process parameters, requires therefore an auxiliary humidification device if it has to be operated at near atmospheric pressure, especially if a high current density output is required. The auxiliary device must be much more efficient with respect to those of the prior art, which allow operation of a stack under extreme process conditions only if over-dimensioned to an unacceptable extent in terms of cost, weight and volume.

Also for applications under pressure, cases in which the presence of an auxiliary system for gas, and especially air, humidification is highly beneficial in terms of overall system efficiency and compactness are quite common. An ordinary example is given by those applications which make use of ambient air pressurised by means of a conventional compressor, also at moderate over-pressure (e.g. 1 bar relative). This compression gives rise to the generation of a remarkable amount of heat, due to the intrinsic irreversibility of the system. The temperature of the compressed air may easily exceed 100–150° C., making it unfit to a direct feeding into the cell. An auxiliary device providing for the humidification of the air flow downstream the compressor and upstream the cell inlet would act also as a conditioner of the air flow itself; it goes without saying that the efficiency of the thermal conditioning depends on the effective degree of saturation of the gas flow, that is on its relative humidity. The mixing of air and water must be completed before reaching the cell inlet in order to achieve a relative humidity level close to 100%.

In some cases, it may be deemed too expensive to use water as the coolant; de-ionised water or distilled water must in fact be used to preserve the metal stacks from corrosion and to avoid the formation of scales which would quickly put them out of use. This requirement is even more stringent when the circuit provides also for the membrane humidification, as the presence of foreign cations, which could replace $H^+$ ions inside the membrane, would thereby block the relevant functional groups and dramatically decrease its conductivity. For these and other reasons, it is often preferable to cool the stacks with air instead of water; however, this implies the need of a suitable humidification device not affected by the drawbacks of the systems of the prior art.

The present invention provides a humidification device for a stack of membrane fuel cells which is more efficient and less expensive than those of the prior art and can provide, totally or partially, for the fuel cell thermal regulation, or may be combined with a suitable thermostating device, for example with the cooling system based on the direct injection of water described in the co-pending Italian patent application No. MI99A 000829, or with a conventional cooling system which can use a liquid other than water.

In one embodiment of the invention, the device may be integrated in a stack of fuel cells according to a conventional filter-press arrangement. In another embodiment of the invention, the humidification device may be provided separately as an independent device, for example to improve the performances of existing stacks manufactured according to the prior art teachings.

In a further embodiment of the invention, the device is capable of humidifying a gaseous flow of reactants to be fed to a fuel cell stack providing at the same time for the thermal regulation of the same gaseous flow.

The device consists of a chamber, completely or partially filled with a reticulated thermally conductive material having a high surface area, fed with the gas to be humidified and with an amount of liquid water at least sufficient to achieve 100% saturation of said gas after evaporation and mixing. The reticulated material should preferably have 50% minimum porosity, and may be made of a single three-dimensional element, or by the juxtaposition of different elements, which may be also two-dimensional, such as metal meshes.

In a particular embodiment of the invention, the water may be supplied in excess so that a portion thereof, after saturation, enters the cells in the liquid state, evaporating therein and contributing, totally or partially, to the thermal regulation of the cells.

In another particular embodiment, the pressure of the gas to be humidified is used to circulate the flow of water used for the humidification of the gas itself, and for the total or partial thermal regulation of the fuel cells, without resorting to auxiliary pumps.

Feeding of gas and water may be provided through two separate inlets to the chamber but preferably it is effected through a single inlet after injection of water in the gaseous flow.

In a particular embodiment of the invention, the injection of water in the gaseous flow provides also for thermostating the gas flow at a suitable temperature to render said flow suitable to be fed into the fuel cells. The chamber may be oriented in any direction but preferably in such a way as to obtain a generally vertical flow. In this case, the chamber is preferably fed with gas and water in the lower part and discharged from the upper part. The reticulated material effects the atomisation of the water inside the gas stream to be humidified, which acts as a carrier and creates turbulent motions favouring the intimate mixing of the two fluids. In order to increase the absolute humidity of the mixture at the outlet, the reticulated element is preferably pre-heated, for example at a temperature comprised between 50° C. and the evaporation temperature of water at the operating pressure. Preferably, the reticulated element is heated with the heat generated by the fuel cells and more preferably the transmission of heat from the cells to the reticulated element takes place essentially by conduction.

The chamber may have the same geometry of the fuel cells to be fed with the humidified gas and may be preferably inserted in the same filter-press arrangement forming the fuel cell stack. The hydraulic connections in this case are completely integrated in the filter-press geometry and the gas fed to the humidification device and saturated with water therein is then conveyed into the cells through suitable channels, according to the prior art teachings.

In another embodiment, the chamber may be supplied separately and contact the stack by means of an external wall to allow the transmission of heat, while the hydraulic connections between the chamber and the stack are external and separate.

Figure 1:
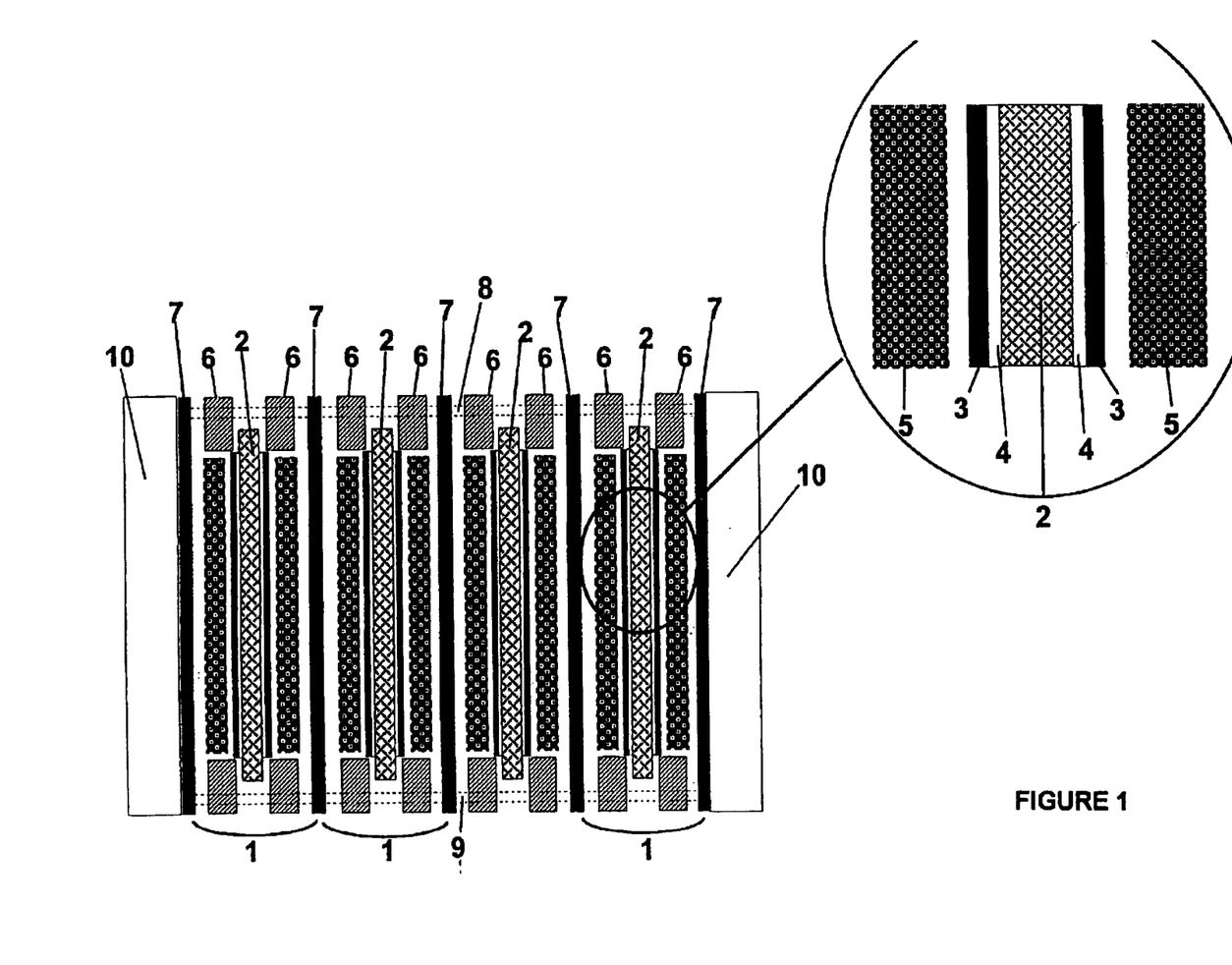
FIG. 1 shows a general scheme of membrane fuel cell stack assembled in a filter-press arrangement.

Making reference to FIG. 1, each elementary cell (1), which represents the repetitive unit of the modular assembly of the filter-press arrangement, comprises, proceeding outwards, an ion-exchange membrane (2), a pair of porous electrodes (3), a pair of catalytic layers (4) formed at the interface between the membrane (2) and each of the electrodes (3), a pair of electrically conductive reticulated elements (5), a pair of gaskets (6) for the peripheral sealing, a pair of bipolar plates (7) which define the borderline of the elementary cell (1). The reticulated elements (5) have a minimum porosity of 50%, and perform the function of electrically connecting the bipolar plates (7) to the electrodes (3), and of distributing the gaseous reactants. When liquid water is added to the gaseous reactants, the former is finely distributed through all the thickness of the reticulated element (5) and its evaporation is therefore facilitated inside the whole volume of the chamber delimited by the bipolar plate (7) and the electrode (3). Suitable holes on the peripheral area of the bipolar plates (7) and of the gaskets (6) form, upon piling up the above mentioned components, the two upper manifolds (8), only one of which is shown in the figure, which may be used to feed the reactants, and the two lower manifolds (9), only one of which is shown in the figure, which may be used for discharging the product water, the inerts and the exhausts. Alternatively, the lower manifolds (9) may be used as feeding ducts and the upper manifolds (8) as discharge ducts. It is also possible feeding one of the two reactants through one of the upper manifolds (8), using the relative lower manifold (9) for discharging, while the other reactant is fed through the other lower manifold (9), using the corresponding upper manifold (8) for discharging.

Externally to the assembly of elementary cells (1) piled up in a filter-press arrangement, two end-plates (10) are provided, one of which equipped with fittings for the hydraulic connection to the manifolds (8) and (9), not shown in the figure, and both provided with suitable holes for the tie-rods used to clamp the whole stack, also not shown in the figure. As the cell (1) is a repetitive unit of a modular assembly, there is no limit to the number of cells which may be assembled in the filter-press arrangement shown in FIG. 1.

Figure 2:
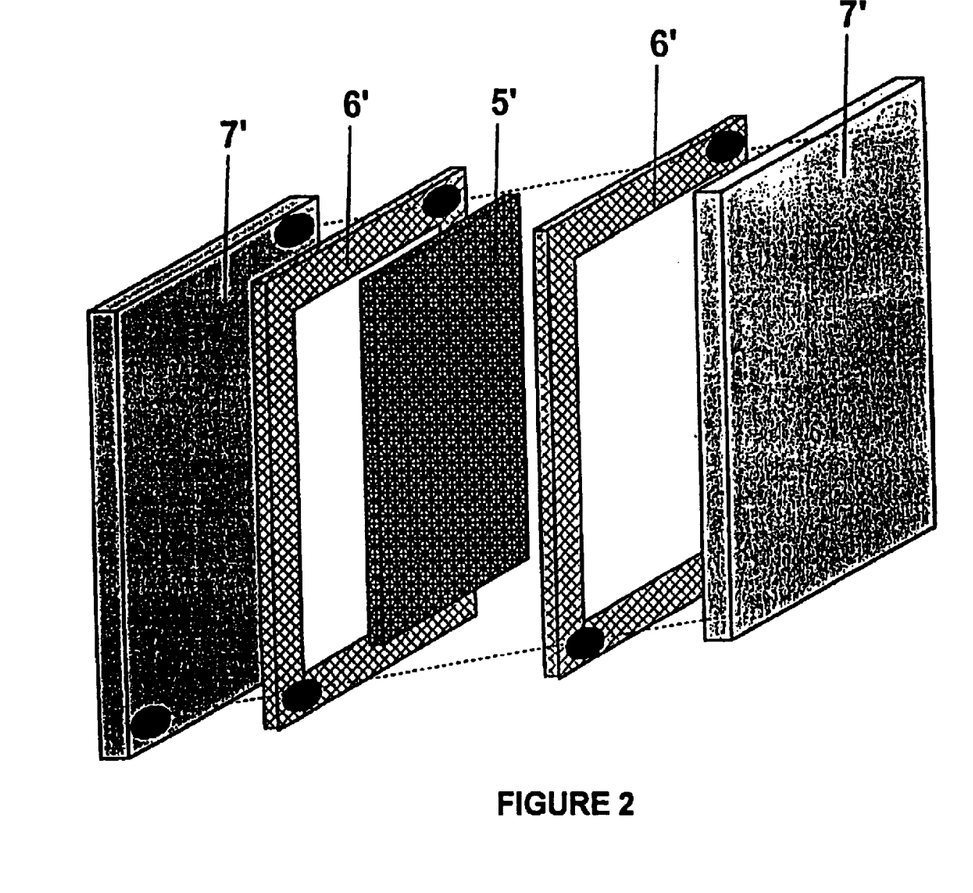
FIG. 2 shows a humidification device according to the present invention

Making reference to FIG. 2, the scheme of a humidification device (11) is shown, delimited by a pair of thermally conductive plates (7') and provided with a thermally conductive filling element (5') and with gaskets (6'). The device may be externally integrated to the stack shown in FIG. 1, or to a stack of any design, or it may be inserted as an integrating element in any filter-press stack arrangement, a specific example of which is shown in FIG. 3.

Figure 3:
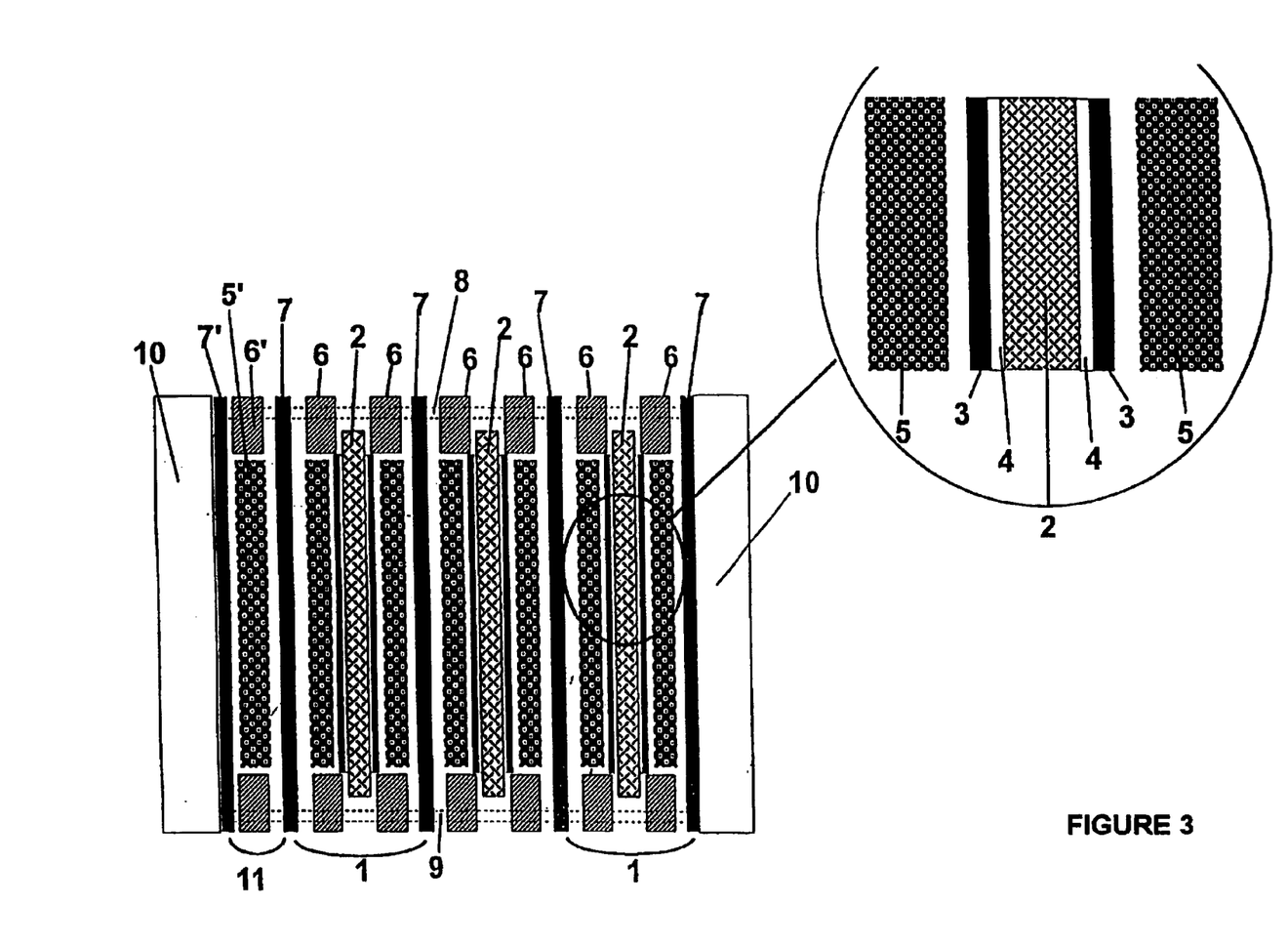
FIG. 3 shows a scheme of membrane fuel cell stack assembled in a filter-press geometry, having a humidification device of the invention integrated therein.

Making reference to FIG. 3, the stack comprises the same elements as the stack of FIG. 1; in addition, a humidification device (11) equivalent to the one illustrated in FIG. 2, is inserted between one of the end-plates (10) and the first of the elementary cells (1), delimited by a metal plate (7') and by the first bipolar plate (7) of the stack, and provided with a thermally conductive filling element (5') and gaskets (6'). As the metal plates (7') for the humidification device (11), the same bipolar plates (7) which delimit the fuel cells (1) may be used. It is also possible resorting to the reticulated element (5) used in the fuel cells (1), as the filling element (5') for the humidification device (11). It is further possible to use the same gaskets (6) used for the fuel cells (1) as gaskets (6') for the humidification device (11). In view of the fact that cell (1) is a repetitive unit of a modular system, there is no limit as to the number of cells which may be assembled in the filter-press arrangement illustrated in FIG. 3; the same applies to the humidification device (11): a plurality of devices (11), connected in series or in parallel, may be introduced in correspondence of one or both ends of the stack, or even be interposed between any pair of cells (1), provided that the thermally conductive element (5') be selected so as to grant the necessary electrical continuity throughout the fuel cell assembly. In such cases, the humidification device (11) may be alternatively delimited by two metal plates (7'), or by two bipolar plates (7), whose structural function is equivalent.

Figure 4:
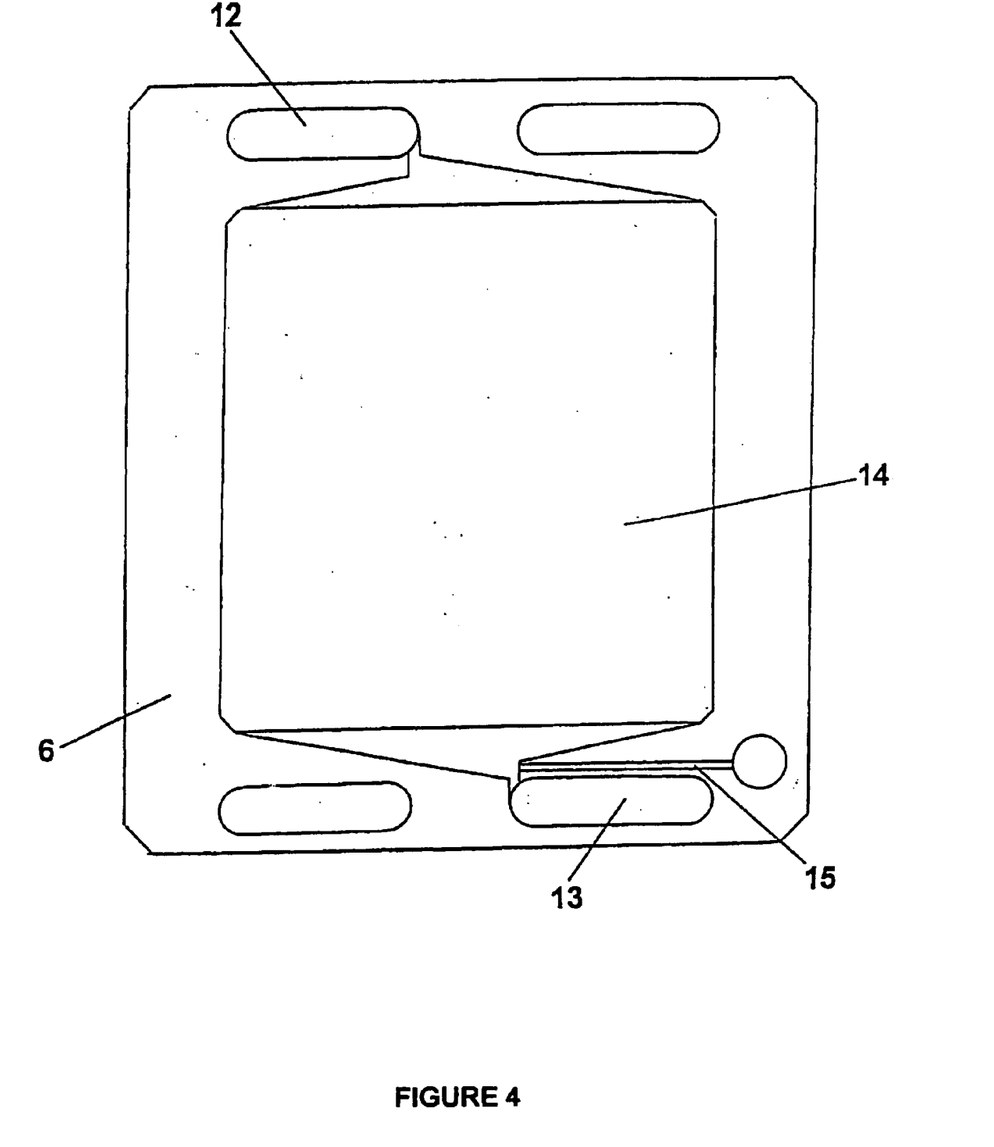
FIG. 4 shows a design of fuel cell gaskets.

Making reference to FIG. 4, a possible configuration of the gasket (6) for fuel cell stacks is shown, comprising an upper hole (12), which, by juxtaposition in a filter-press arrangement, forms the upper manifold (8), a lower hole (13), which, by juxtaposition in a filter-press arrangement, forms the lower manifold (9), the housing (14) for the reticulated material (5) and, optionally, one or more channels for water injection (15).

Figure 5:
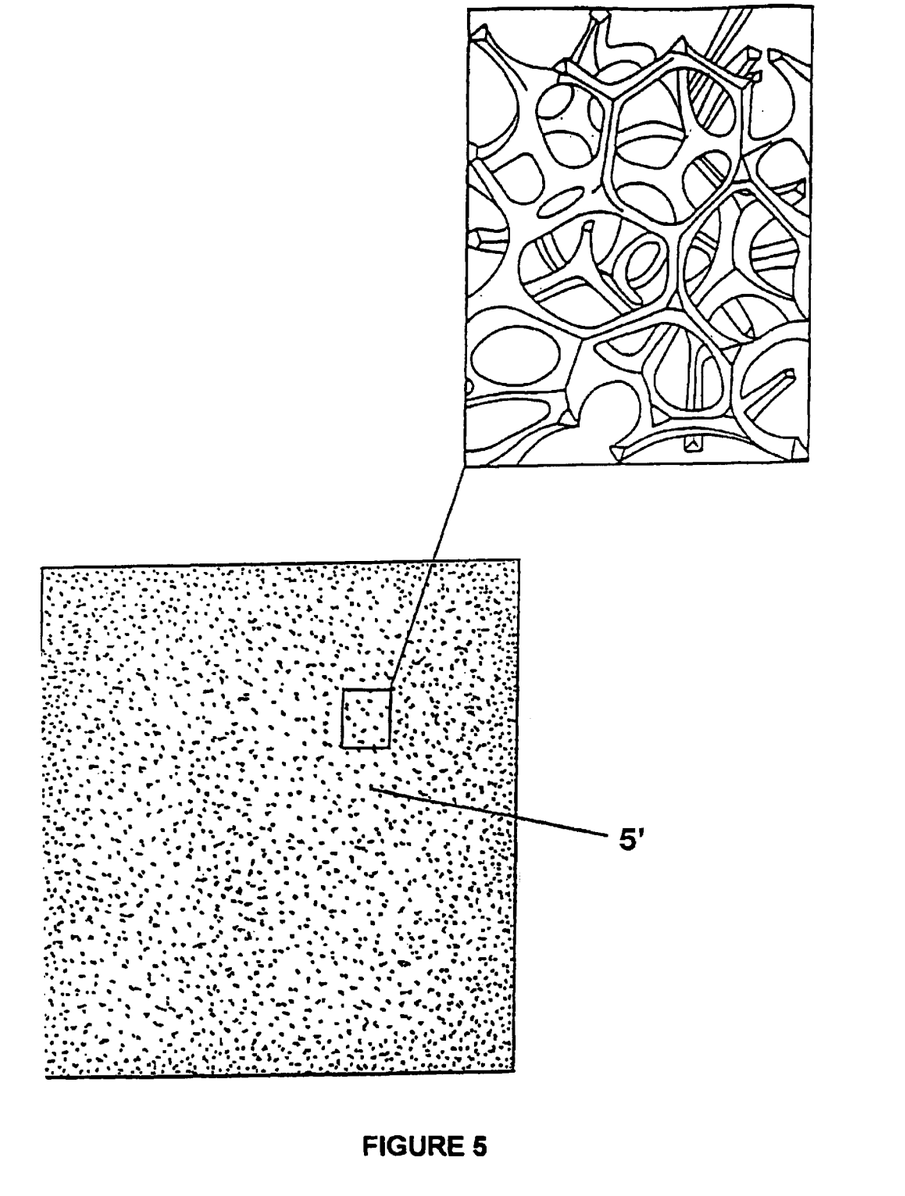
FIG. 5 shows a possible design of a reticulated element to be used both for the distribution of the fluids and for the connection between bipolar plates and electrodes inside the fuel cell stack, as well as a filling material for the humidification device of the invention.

Making reference to FIG. 5, a particular embodiment of the thermally conductive reticulated element (5), made of a deformable metallic material, in the specific case a metal foam, is shown.

The invention will be now better illustrated by means of some examples, which are not intended to limit the same.

EXAMPLE 1

One stack made of 30 fuel cells was manufactured according to the scheme of FIG. 1, and equipped with the following components:

ion-exchange membranes (2) Nafion® 115, commercialised by Dupont de Nemours

Electrodes (3) commercialised by E-Tek, Inc. under the trademark ELAT®, with an active surface of 200 $cm^2$, activated with a catalytic layer (4) made of platinum particles supported on active carbon.

Reticulated elements (5) made of a nickel foam as shown in FIG. 5, with a pore size comprised between 1 and 3 mm.

Gaskets (6) according to the configuration of FIG. 4

Bipolar plates (7) made of a 2 mm thick stainless steel sheet.

Aluminum end-plates (10), electrically connected to the bipolar plates (7) of the external cells, provided with current collecting sockets connected to a variable resistive load.

The stack was connected through the suitable fittings on one end-late (10), to the lines for supplying the gaseous reactants and to an external circuit where demineralised water, thermostated at the predetermined temperature by means of a heat exchanger, was circulated. By means of these connections, the stack was fed with pure hydrogen pressurised at 3 bar absolute at the negative pole (anode), and with synthetic air, whose pressure was reduced to 3 bar abs, coming from cylinders, at the positive pole (cathode), both through the lower manifolds (9), obtained by the juxtaposition in filter-press configuration of lower holes (13) and of the corresponding holes in the bipolar plates (7). A stream of demineralised water, whose flow-rate was regulated as needed, following the operating indications of the system, was fed from the corresponding circuit to the injection channels (15). The stack was provided with no auxiliary cooling, besides the one effected by the evaporation of the water injected into the channels (15).

The stack was operated for 12 hours at a current density of 700 $mA/cm^2$, regulating the cell temperature at 75° C., and monitoring the single cell voltages. The water flow-rate was regulated manually up to maximising the voltage of the single cells. After this manual regulation, on all the cells of the stack a voltage comprised between 680 and 700 mV, stable With time, was detected.

The same stack was operated feeding the gaseous reactants at a near atmospheric pressure (80 millibar relative).

Initial cell voltages comprised between 540 and 620 mV were detected, with a tendency to decrease with time, at different rates for the various cells of the stack. The test was discontinued after thirty minutes, when the voltage of some of the cells dropped below 300 mV.

The latter test was repeated, previously feeding the air flow in the humidification device of FIG. 2, which was further supplied with water at a temperature close to the one of the stack. An external wall of the device was put in direct contact with an end-late (10) of the stack, to allow heat exchange. As a result, the humidification device was brought to an operating temperature close to the one of the stack. The stack fed with the reactants at a relative pressure of 80 millibar was operated for 12 hours continuously, at a current density of 700 mA/cm$^2$ and regulating the temperature at 75° C. Under these conditions, the voltage of the single cells remained stable, comprised between 620 and 640 mV.

EXAMPLE 2

A 30 fuel cell stack was manufactured according to the scheme of FIG. 3, and equipped with the following components:

- ion-exchange membranes (2) Nafion® 115, commercialised by Dupont de Nemours
- Electrodes (3) commercialised by E-Tek, Inc., under the trademark ELAT, with an active surface of 200 cm$^2$, activated with a catalytic layer (4) made of platinum particles supported on active carbon.
- Reticulated elements (5) made of a nickel foam as shown in FIG. 5, having a pore size comprised between 1 and 3 mm
- Gaskets (6) according to the scheme of FIG. 4
- Bipolar plates (7) made of a 2 mm thick stainless steel sheet.
- Two humidification devices (11), each one connected to the inlet of one of the two reactants, comprising a metal plate (7') and a reticulated element (5'), made of a nickel-chromium foam, as shown in FIG. 5, having a pore size comprised between 1 and 3 mm.
- Aluminum end-plates (10), each one electrically connected to the bipolar plates (7) of the external cells, provided with current collecting sockets connected to a variable resistive load.

The stack was connected through the apposite fittings on one end-plate (10), to the lines for supplying the gaseous reactants, whose pressure was partially exploited to surge a flow of water from an external tank, in an excess quantity with respect to the amount necessary for saturation; the flow of gaseous reactants, thus mixed with water, traversed the relative humidification device (11) where saturation was carried out. The two flows of saturated gaseous reactants, along with the excess water, were fed to the relevant compartment of the single cells. With such an arrangement, the stack was fed with pure hydrogen pressurised at 3 bar absolute at the negative pole (anode), and with air coming from a compressor at 3 bar absolute and at 160° C. at the positive pole (cathode), both through the lower manifolds (9), obtained by the juxtaposition in a filter-press configuration of the lower holes (13) and the corresponding holes in the bipolar plates (7). The flow of water injected in the compressed air realised the cooling of the latter down to 75° C. The stack was provided with no auxiliary cooling, besides the one effected by the evaporation of the excess water supplied to the single cells together with the saturated gaseous reactants.

The stack was operated for 12 hours at a current density of 700 mA/cm$^2$, setting the cell temperature at 75° C., and monitoring the single cell voltages. The water flow-rate was regulated manually up to maximising the voltage of the single cells. After this manual regulation, a voltage comprised between 690 and 700 mV, stable with time, was detected, on all the cells of the stack.

The same test was repeated with the reactants pressurised at 300 millibar relative, which an over-pressure still sufficient to draw water off the external tank. Under these conditions, maintained for 8 hours, the cell voltages were all comprised between 660 and 675 mV at a current density of 700 mA/cm$^2$.

EXAMPLE 3

A 20 fuel cell stack was manufactured according to the scheme of FIG. 3, and equipped with the following components:

- ion-exchange membranes (2) Nafion® 115, commercialised by Dupont de Nemours
- Electrodes (3) commercialised by E-Tek, Inc., under the trademark ELAT®, with an active surface of 200 cm$^2$, activated with a catalytic layer (4) made of platinum particles supported on active carbon.
- Reticulated elements (5) made of a nickel foam, having a pore size comprised between 1 and 3 mm
- Gaskets (6) provided with holes for feeding the reactants and discharging the product water and the exhausts.
- Die-cast bipolar plates (7) made of an aluminum alloy, having a thickness of 5 mm and housing a stainless steel serpentine to provide for the circulation of a thermostating fluid.
- A humidification device (11), connected to the air feeding point, comprising a metal plate (7') and a reticulated element (5'), made of a nickel-chromium foam, as shown in FIG. 5, with pores comprised between 1 and 3 mm.
- Aluminum end-plates (10), one electrically connected to the bipolar plates (7) of one of the external cells, the other one connected to the plate (7') of the humidification device, provided with current collecting sockets connected to a variable resistive load.

The stack was connected through the suitable fittings provided on one of the end-plates (10) to the gaseous reactant supplies; on the air side, the pressure of the inlet flow was partially exploited to surge the amount of water needed for the humidification from an external tank; the air flow, thus mixed with water, passed through the humidification device (11) where saturation occurred, prior to entering the fuel cells. No humidification system was provided in the fuel compartment.

The stack was also connected to a cooling circuit provided with a heat exchanger wherein demineralised water was circulated and fed to the serpentines housed in the bipolar plates (7), mutually connected in series through a suitable manifold.

By means of said arrangement, the stack was fed with pure hydrogen pressurised at 300 millibar relative at the negative pole (anode) and with air at the same pressure at the positive pole (cathode) through the upper manifolds (8). The flow of water fed to the serpentines permitted to regulate the temperature of the bipolar plates (7) at 70° C.

The stack was operated at a current density of 700 mA/cm$^2$ for 12 hours, during which all the cells showed stable voltages comprised between 630 and 650 mV.

Although the invention has been described with reference to specific embodiments, the latter are not intended to limit the invention, whose extent is defined in the appended claims.

Throughout the description and claims of the specification the word "comprise" and variations of the word, such as "comprising" and "comprises" is not intended to exclude other additives, components, integers or steps.

What is claimed:

1. A device for the humidification of reactants in stacks of polymer membrane fuel cells fed at least with a gaseous reactant, comprising at least a first external wall and a second external wall delimiting a chamber which contains a reticulated material having a porosity of at least 50% fed with the at least one gaseous reactant and water.

2. The device of claim 1 wherein said reticulated material is thermally conductive.

3. The device of claim 1 wherein said reticulated material is a metal foam.

4. A stack of elements arranged in a filter-press configuration, wherein the elements comprise at least one polymer membrane fuel cell and at least one humidication device of claim 1.

5. A stack of polymer membrane fuel cells arranged in a filter-press configuration, provided with a plurality of external walls, comprising at least one humidification device of claim 1 disposed externally to the stack.

6. The stack of claim 5 wherein said first external wall is in contact with an external wall of the stack.

7. A polymer membrane fuel cell stack fed at least with one gaseous reactant comprising at least one humidification device comprising a chamber which contains a reticulated material fed with the at least one gaseous reactant and water.

8. A process for humidification of reactants in stacks of polymer membrane fuel cells with a device comprising at least one first external wall and one second external wall delimiting a chamber containing a reticulated material having a porosity of at least 50% comprising feeding a gaseous reactant and water into said chamber.

9. The process of claim 8 wherein an excess of amount of said water is fed into said chamber with respect to the amount required for the saturation of said at least one gaseous reactant, and said excess amount of water evaporates at least partially in the polymer membrane fuel cells thereby removing at least part of the heat generated therein.

10. The process of claim 8 wherein said water is supplied from a tank pressurized by said at least one gaseous reactant.

11. The process of claim 8 wherein said at least one gaseous reactant is air.

12. The process of claim 11 wherein said air is fed in said chamber at a temperature above 100° C., and is cooled upon contacting said water in said chamber down to a temperature lower than 100° C. prior to entering the fuel cells.

13. The process of claim 8 wherein said at least one gaseous reactant and said water have a generally vertical flow.

14. The process of claim 13 wherein said vertical flow of said gaseous reactant, and water is directed upward.

15. The process of claim 8 wherein said at least one humidification device is heated at a temperature comprised between 50° C. and the temperature of said at least one fuel cell.

16. The process of claim 8 wherein said reticulated material is heated at a temperature comprised between 50° C. and the temperature of the fuel cells by the transfer of at least part of the heat generated within said fuel cells.

17. The process of claim 16 wherein said transfer occurs by heat conduction.

* * * * *